(12) United States Patent
Nakamuru et al.

(10) Patent No.: US 7,765,652 B2
(45) Date of Patent: Aug. 3, 2010

(54) BUCKLE DEVICE ATTACHED WITH SWITCH

(75) Inventors: Toru Nakamuru, Kanagawa (JP); Ayaki Oyamada, Kanagawa (JP); Yukinori Midorikawa, Kanagawa (JP)

(73) Assignee: Autoliv Development AB, Vargarda (SE)

( * ) Notice: Subject to any disclaimer, the term of this patent is extended or adjusted under 35 U.S.C. 154(b) by 146 days.

(21) Appl. No.: 12/047,726

(22) Filed: Mar. 13, 2008

(65) Prior Publication Data

US 2008/0163468 A1    Jul. 10, 2008

Related U.S. Application Data

(63) Continuation of application No. PCT/JP2006/315929, filed on Aug. 11, 2006.

(30) Foreign Application Priority Data

Sep. 13, 2005    (JP) .............................. 2005-265760

(51) Int. Cl.
    *A44B 11/26*    (2006.01)
(52) U.S. Cl. ......................................... 24/633; 24/641

(58) Field of Classification Search ................... 24/633, 24/637, 638, 641, 643, 647, 650; 297/468
See application file for complete search history.

(56) References Cited

FOREIGN PATENT DOCUMENTS

| JP | 2001-224408 | 8/2001 |
|---|---|---|
| JP | 2003-81053 | 3/2003 |
| JP | 2003-81057 | 3/2003 |
| JP | 2003-125811 | 5/2003 |
| JP | 2003-1258111 | 5/2003 |
| JP | 2004-49358 | 2/2004 |
| JP | 2004-121602 | 4/2004 |
| JP | 2004-135779 | 5/2004 |

*Primary Examiner*—James R Brittain
(74) *Attorney, Agent, or Firm*—Brinks Hofer Gilson & Lione

(57) ABSTRACT

A buckle device includes a switch having a Hall element which outputs a signal in accordance with a magnitude of a magnetic flux density, a magnet which applies a magnetic field to the Hall element, and a shielding plate which is attached to an ejector so as to change the magnitude of the magnetic flux density transmitted from the magnet to the Hall element in accordance with a position of the ejector. The Hall element and the magnet are magnetically shielded by at least a frame and a latch member which are formed of a magnetic material.

4 Claims, 4 Drawing Sheets

BUCKLE DEVICE ATTACHED WITH SWITCH

CROSS REFERENCE TO RELATED APPLICATIONS

This application claims priority to PCT patent application WO2007/032168 filed Aug. 11, 2006 and JP patent application 2005-265760 filed on Sep. 13, 2005.

FIELD OF THE INVENTION

The present invention relates to a buckle device with a switch for monitoring whether a tongue plate of a seat belt is attached to or detached from a buckle main body.

BACKGROUND OF THE INVENTION

In general, a seat belt device is disposed in seats of various transportation vehicles to protect a passenger in an emergency such as a collision. Often, a buckle device is also disposed therein to facilitate carrying out an attaching operation or a detaching operation of the seat belt device. A typical buckle device is configured such that a spring urges a latch member for latching a tongue plate in a direction in which the tongue plate is latched and a lock member allows the latch member to maintain a latch state in which the tongue plate is latched to a buckle main body.

In such a buckle device, it may be necessary to display or otherwise indicate the latch state of the tongue plate with the buckle main body by using a lamp or to control an operation of a belt winding force via a retractor. Alternatively, it may be necessary to transmit information, regarding whether the seat belt device is attached or detached to an airbag ECU (electronic control unit). For this reason, a buckle device for detecting a latch state may be disposed inside the buckle main body (for instance, see Patent Documents 1 to 4 which are further identified below).

In the buckle devices disclosed in Patent Documents 1 to 4, a non-contact switch, in which a Hall element and a magnet are disposed adjacent to the buckle main body, is disclosed.

Specifically, the buckle device disclosed in Patent Document 1 is in an OFF state when the magnet disposed in an ejector is separated from the Hall element in a non-latch state. Moreover, the buckle device is in an ON state when the magnet is adjacently located just below the Hall element in a latch state. Since the Hall element is surrounded by a magnetic shielding frame, magnetism of an external magnetic field is shielded and the Hall element is restricted from being affected by an external magnetic field.

Additionally, the buckle devices disclosed in Patent Documents 2 to 4 provide a pair of magnets. When a latch member moves between a non-latch state and a latch state, the magnet opposed to the Hall element changes from the magnet on one side to that on the other side. Accordingly, a direction in which a magnetic field is applied to the Hall element changes, so that a direction of current generated by electromotive power of the Hall element reverses, thereby detecting whether the tongue plate is attached or detached. Patent documents 1 to 4 are respectively JP-A-2004-49358, JP-A-2004-135779, JP-A-2004-121602, and JP-A-2003-81057.

In the buckle device disclosed in Patent Document 1, although the Hall element is surrounded by the frame to restrict the influence of an external magnetic field, it is difficult to sufficiently restrict the influence of the external magnetic field. Additionally, in the buckle device disclosed in Patent Documents 1 to 4, since it is a proximity sensor for detecting whether the tongue plate is attached or detached on the basis of the movement of the magnet, magnetic flux density applied to the Hall element is dependent on a distance between the Hall element and the magnet. For this reason, it may be necessary to prevent an abnormal operation by setting a positional difference of the magnet to a small value.

BRIEF SUMMARY OF THE INVENTION

In at least one embodiment of the present invention, a buckle device with an attached switch which may restrict an influence of an external magnetic field and which can be easily configured without an error is provided.

In one embodiment, a buckle device with an attached switch is provided. The buckle device includes a tongue plate which is disposed in a seat belt. A buckle main body is for the tongue plate to be attached or detached. A switch monitors whether the tongue plate is attached to or detached from the buckle main body. The buckle main body includes a frame and an ejector. The ejector is disposed on the frame (the term "disposed on" is hereinafter understood to include "disposed adjacent to" and "disposed in") so as to slide in a direction in which the tongue plate is inserted or separated and which pushes the tongue plate from the buckle main body upon releasing a latch action between the tongue plate and the buckle main body. A latch member rotates to latch the tongue main body upon inserting the tongue plate into the buckle main body. The switch includes a magnetic detector which outputs a signal in accordance with a magnitude of magnetic flux density. A magnet applies a magnetic field to the magnetic detector. A shielding plate is attached to the ejector and interlocked with the ejector and which changes a magnitude of magnetic flux density applied from the magnet to the magnetic detector in accordance with a position of the ejector. The magnetic detector and the magnet are magnetically shielded by at least the frame and the latch member which are made of a magnetic material.

In one aspect, the frame includes a pair of side walls and a bottom portion provided between the pair of side walls. The magnetic detector is disposed in a position which is far from the side wall relative to the magnet.

In another aspect, the switch includes a cover member which is attached to the bottom portion of the frame so as to be surrounded by the frame and the latch member and accommodates the magnetic detector and the magnet therein. The cover member includes an insertion-through hole formed between the magnetic detector and the magnet so that the shielding plate is inserted therethrough.

In yet another aspect, when the tongue plate is further inserted from a position of the latch state in which the tongue plate is latched to the buckle main body, a part of the shielding plate comes into contact with the frame.

According to the principles of the present invention, the switch includes the magnetic detector, which outputs a signal in accordance with a magnitude of magnetic flux density, the magnet, which applies a magnetic field to the magnetic detector, and the shielding plate, which is attached to the ejector and interlocked with the ejector and which changes a magnitude of magnetic flux density applied from the magnet to the magnetic detector. Since the magnetic detector and the magnet are magnetically shielded by at least the frame and the latch member, which are made of a magnetic material, it is possible to restrict the influence of the external magnetic field. Additionally, since the magnetic flux density detected by the magnetic detector is hardly influenced by a positional difference of the shielding plate with respect to the magnetic detector and the magnet, it is easy to configure the switch without an error.

BRIEF DESCRIPTION OF THE DRAWINGS

FIGS. 3a and 3b are schematic sectional views illustrating the buckle switch when taken along the line 3-3 shown in FIG. 1 and the line III-III shown in FIG. 2, in which FIG. 3A illustrates an initial state before a tongue plate is inserted and FIG. 3B illustrates a latch state in which the tongue plate is inserted; and FIGS. 4a and 4b are top views illustrating an operation of a shielding plate, in which FIG. 4A illustrates an initial state, FIG. 4B illustrates a latch state.

DETAILED DESCRIPTION

Figure 1:
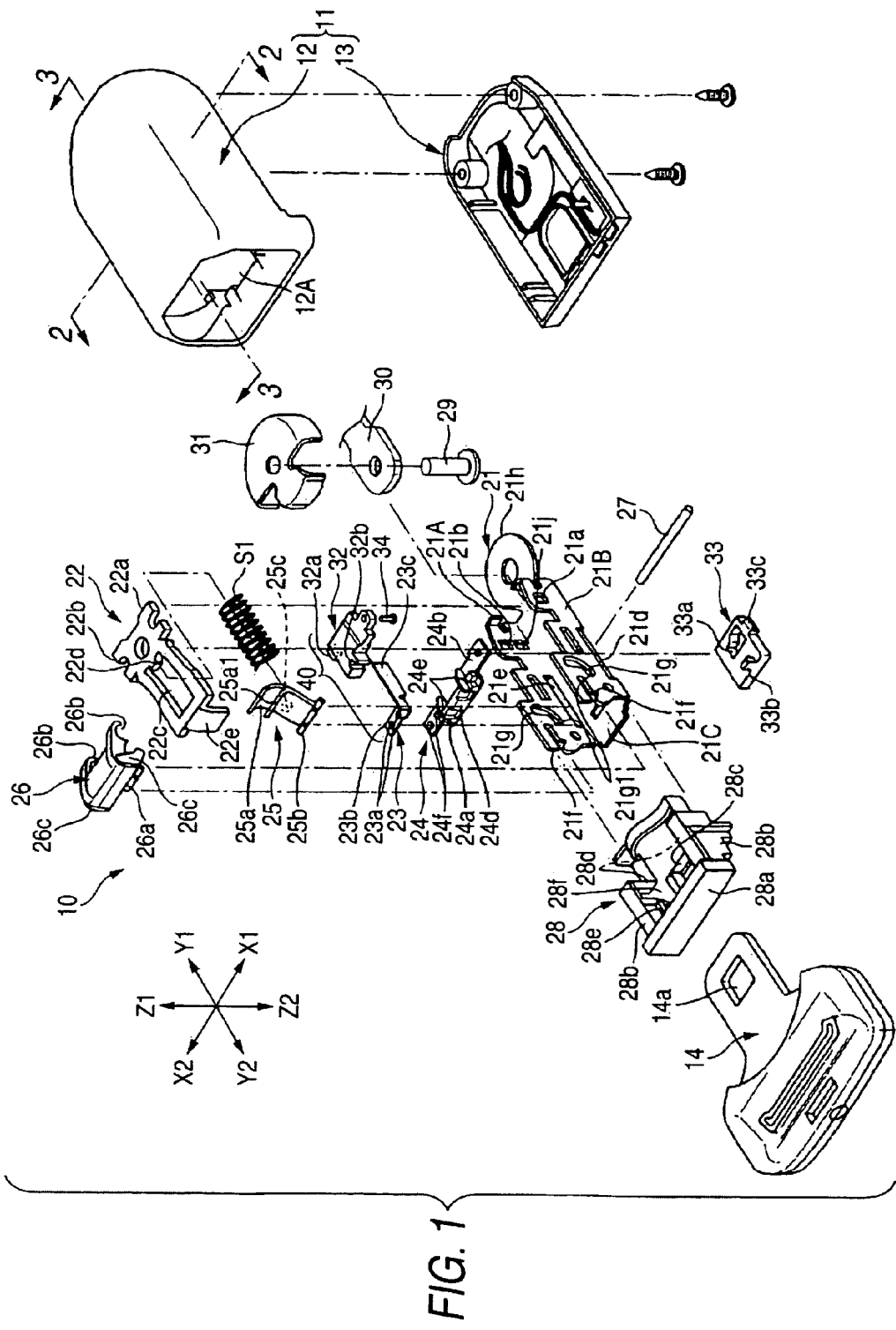
FIG. 1 is an exploded perspective view illustrating a buckle device attached with a switch according to an embodiment of the present invention.

A buckle device 10 shown in FIG. 1 includes a buckle main body 11, which mainly has an upper cover 12 and a lower cover 13, and a tongue plate 14, which is attached to or detached from the buckle main body 11.

A frame 21, which includes a pair of side walls 21A and 21B and a bottom portion 21C provided between the pair of side walls 21A and 21B and which may be made of a metal plate such as S55C with a cross-section U-shape, is provided inside the buckle main body 11. In addition, a latch member 22, preferably made of a metal plate such as S45C and S50C, is provided inside the frame 21. The latch member 22 has supporting arms 22a and 22b which are provided at one end thereof (end close to the direction shown by Y1) so as to protrude in the shown X1 and X2 directions, respectively, and to be movably supported by supporting holes 21a and 21b provided in the side walls 21A and 21B, respectively. An opening 22C is formed at the center of the latch member 22 and a lock convex portion 22d is formed at the edge of the opening 22C so as to protrude in the direction shown by Y2. A convex-shaped latch portion 22e is provided in the front end (end close to the direction shown by Y2) on the other side of the latch member 22 so as to protrude in the direction shown by Z2 and to advance to a latch hole 21c (see FIGS. 3A and 3B) formed in the bottom portion 21C of the frame 21.

An ejector 24, which may be made of a resin material or plastic such as polyacetal, is provided between the latch member 22 and the bottom portion 21C of the frame 21. The ejector 24 includes a base portion 24a formed in a U-shape and arm portions 24b and 24c which extend from both front ends of the base portion 24a to both sides (in the directions shown by X1 and X2). Further, a pressed portion 24d is formed in a surface of the base portion 24a close to the direction shown by Y2. Furthermore, a pair of retaining holes 24e, 24e is formed in an inner surface of the base portion 24a close to the direction shown by Y1 in FIG. 1.

The arm portions 24b and 24c are inserted through long holes 21d and 21e respectively formed between the bottom portion 21C and both side walls 21A and 21B, and the front ends thereof extend to the outside of the frame 21. Owing to the movement of the arm portions 24b and 24c within the long holes 21d and 21e, the ejector 24 can slide on the frame 12 in the direction in which the tongue plate 14 is inserted or detached.

Additionally, a pair of erected portions 24f, 24f is provided in a surface of the arm portion 24c close to the direction shown by Z1 in FIG. 1. A shielding plate 23 as a component of a switch 40 is attached to the arm portion 24c in such a manner that the pair of erected portions 24f is fixed to hole portions 23a through a heat caulking or staking process while the pair of erected portions 24f is inserted through the hole portions 23a. The shielding plate 23 may be made of a metal plate such as SPCC and a shielding portion 23c extending in the direction shown by Y is provided in such a manner that an attachment portion 23b having the hole portions 23a formed therein is bent at about a right angle.

A cantilever 25 which has a lock portion 25a formed into a curved surface at the front end thereof and which has a shaft portion 25b retained in the retaining holes 24e of the base 24a is rotatably supported by the U-shaped base portion 24a of the ejector 24. In addition, a lock convex portion 25a1 is provided in a surface of the lock portion 25a.

In addition, a spring retaining protrusion portion 25c is formed in a surface of the cantilever 25 and an urging member S1, such as a coil spring, is provided in a compressed state between the spring retaining protrusion portion 25c and the lock convex portion 22d of the latch member 22. At this time, urging force exists between the spring retaining protrusion portion 25c and the lock convex portion 22d in the direction in which the spring retaining protrusion portion 25c is away from the lock convex portion 22d. At a normal time, the urging member S1 urges the lock portion 25a, corresponding to the front end of the cantilever 25, in the counterclockwise direction shown in FIG. 1 (in the clockwise direction shown in FIG. 3).

As shown in FIG. 1, notch portions 21f, 21f, including a long groove which extends in the direction shown by Y and a concave groove which is dug in the direction shown by Z1, are formed in both side walls 21A and 21B of the frame 21 close to the direction shown by Y2. A stopper 26 is movably supported by the concave groove of the notch portions 21f, 21f in the state in which a rotation shaft 26c is inserted therethrough. An operation shaft 26a, which extends in the directions shown by X1 and X2, is formed in the lower end of the stopper 26 in the direction shown by Z2 and retaining portions 26b are formed integrally with the front end thereof in the direction shown by Y1. Additionally, the retaining portions 26b are disposed in the movement track of a lock bar 27 described below.

Figure 3A:
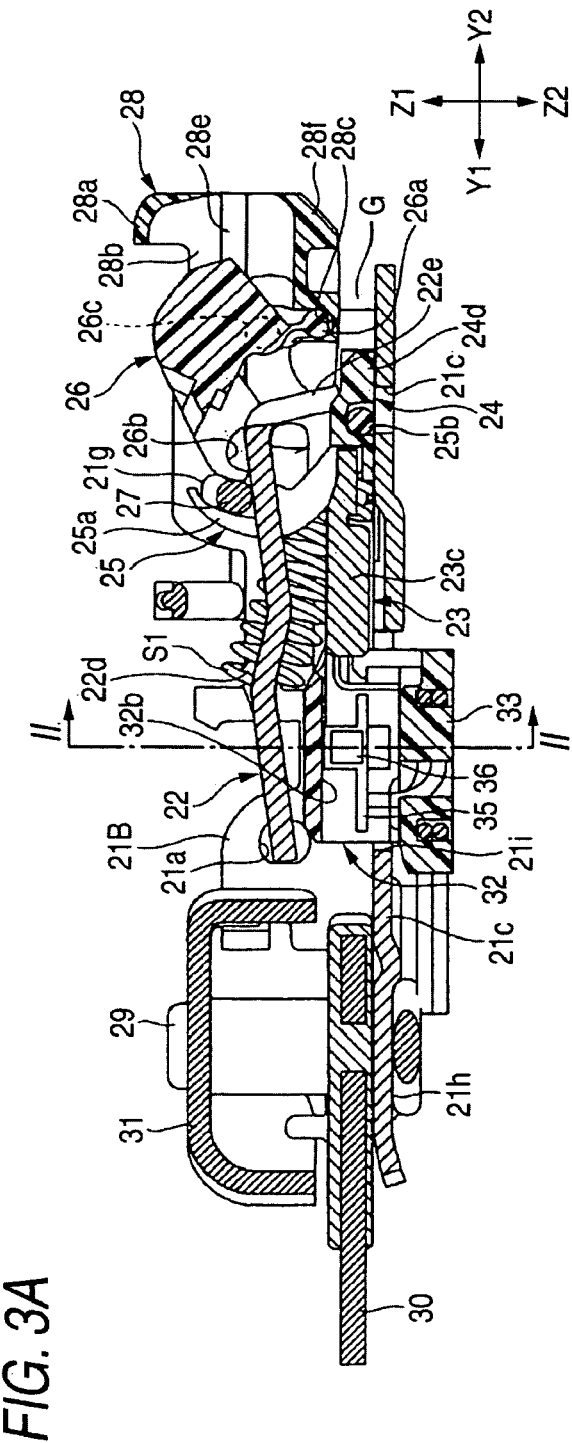
Figure 3B:
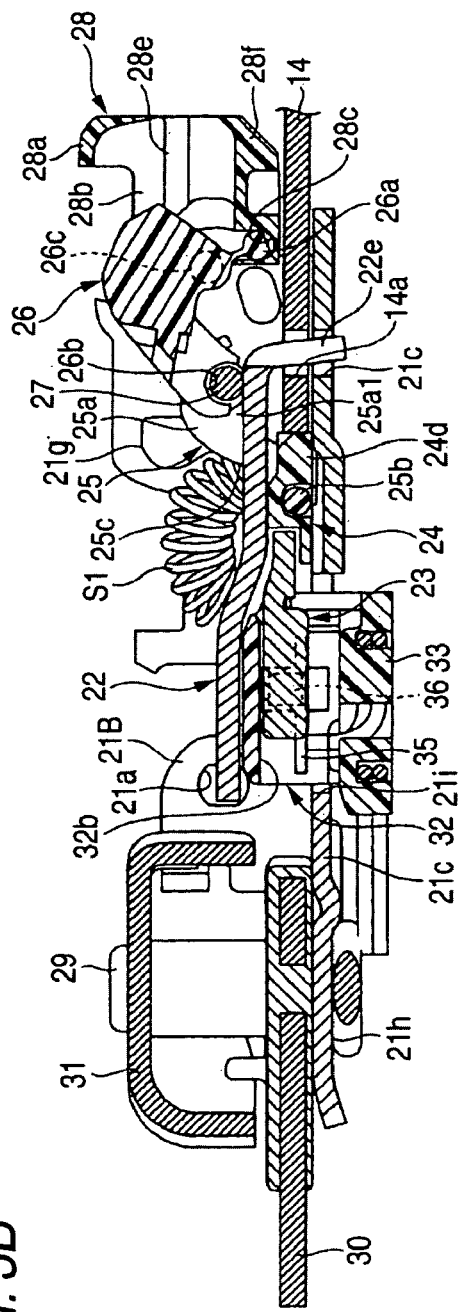

Guide holes 21g, 21g with a substantially L-shape are punched in the both side walls 21A and 21B of the frame 21 so as to be substantially symmetric with each other, and the lock bar 27 is inserted through the inside of the guide holes 21g, 21g. As shown in FIGS. 3A and 3B, the lock bar 27 can move within the guide holes 21g together with the cantilever 25. Additionally, as shown in FIG. 3B, the lock bar 27 is locked to the lock portion 25a of the cantilever 25 and is retained in the retaining portions 26b, 26b of the stopper 26.

A release button 28 is provided in the frame 21 close to the direction shown by Y2 so as be moveable in the direction in which an attachment or a detachment is carried out. The release button 28 includes an operation portion 28a which is exposed to the outside through an opening 12A provided in the upper cover 12 close to the direction shown by Y2 and leg portions 28b which extend from the operation portion 28a in the direction shown by Y1. Operation concave portions 28d, 28d are formed in the front ends of the leg portions 28b, 28b and both ends of the lock bar 27 which extend from the guide holes 21g, 21g of the frame 21 to the outside are inserted in the operation concave portions 28d, 28d.

Guide convex portions 28e, 28e are formed in both inner surfaces of the leg portions 28b, 28b so as to protrude to the inside and to extend in the direction shown by Y. The guide convex portions 28e, 28e are respectively inserted in the long grooves of the notch portions 21f, 21f formed in the frame 21. When the release button 28 moves in the direction shown by Y1 or Y2, the guide convex portions 28e, 28e are guided along the long grooves of the notch portions 21f, 21f. Accordingly, the release button 28 can move in parallel to the bottom portion 21C of the frame 21.

The release button 28 includes a lower end portion 28f which protrude from a surface of the operation portion 28a close to the direction shown by Y1. A bearing groove 28c is formed in the lower end portion 28f so as to extend in the direction shown by X and the operation shaft 26a of the stopper 26 is rotatably inserted into the bearing groove 28c. Accordingly, when the operation portion 28a of the release button 28 is pressed in the direction shown by Y1, since the bearing groove 28c presses the operation shaft 26a of the stopper 26 in the direction shown by Y1, it is possible to rotate the stopper 26 in the counterclockwise direction shown in FIG. 1 (in the clockwise direction shown in FIG. 3). In the same manner, when the release button 28 is moved in the direction shown by Y2, it is possible to rotate the stopper 26 in the clockwise direction shown in FIG. 1 (in the counterclockwise direction shown in FIG. 3).

In addition, a gap G to which the tongue plate 14 can be inserted is provided between the lower end portion 28f of the release button 28 and the bottom portion 21C of the frame 21 (see FIG. 3A). A plate attachment portion 21h extends to the bottom portion 21C of the frame 21 close to the direction shown by Y1. Then, the plate attachment portion 21h, the front end on one side of an anchor plate 30 inserted from the insertion portion of the buckle main body 11, and a plate cover 31 attached to a position thereabove are fixed to one another via a rivet 29. An end on the other side of the anchor plate 30 is locked from a side of a seat to the vehicle frame and the like.

In addition, a switch attachment hole 21i is formed between the bottom portion 21C of the frame 21, the latch hole 21c, and the plate attachment portion 21h. A HES (Hall Effect Switch) cover 32 as a cover member is disposed in the switch attachment hole 21i so as to protrude upward and a harness restricting cover 33 is disposed below the switch attachment hole 21i.

As shown in FIG. 1, a convex portion 32a of the HES cover 32 is inserted into an insertion hole 21j formed in the side wall 21A of the frame 21 and the HES cover 32 is fixed to the bottom portion 21C of the frame 21 by a rivet 34. In addition, the harness restricting cover 33 is attached to the frame 21 together with the HES cover 32 in such a manner that a claw portion (not shown) formed in the HES cover 32 is engaged with a harness insertion-through hole 33a and two claw portions 33b and 33c formed in the harness restricting cover 33 are engaged with the upper surface of the HES cover 32 and the switch attachment hole 21i of the frame 21, respectively.

Figure 2:
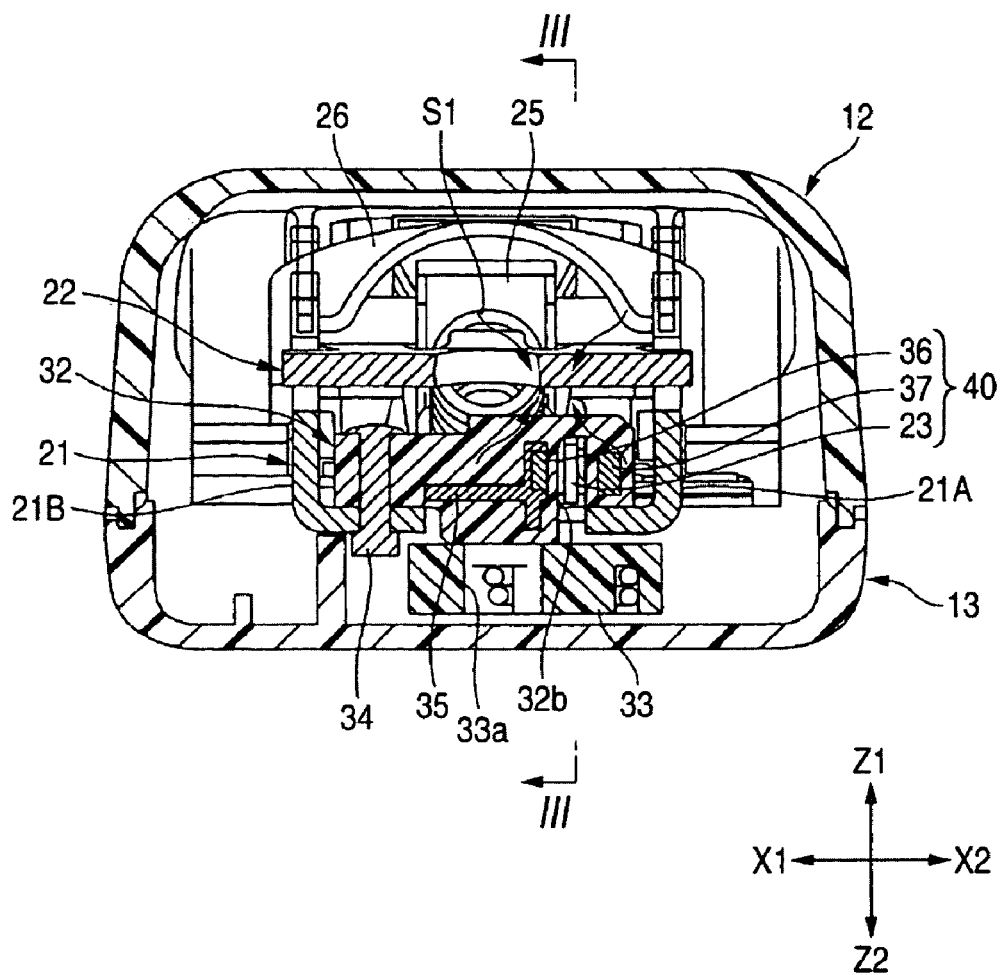
FIG. 2 is a sectional view illustrating a buckle switch mounted to a buckle device when taken along the line 2-2 shown in FIG. 1 and the line II-II shown in FIG. 3.

The HES cover 32 is made by performing a potting process to resin material such as polybutylene-terephthalate by use of urethane resin. As shown in FIG. 2, the HES cover 32 accommodates components of the switch 40 therein such as a print substrate 35 which may be made of SEM-3, a Hall element 36 as a magnetism detector which is disposed on the print substrate 35 to output a signal in accordance with a magnitude of magnetic flux density, and a magnet 37 which applies a magnetic field to the Hall element 36. The Hall element 36 and the magnet 37 overlaps with each other in the direction in which the tongue plate is attached or detached and are sequentially arranged with a gap therebetween in the width direction of the frame 21. The Hall element 36 is positioned far from the side wall 21A of the frame 21 relative to the magnet 37, and is disposed close to the center in the width direction of the frame 21. An operational amplifier (voltage amplifier) or a comparator (not shown) other than the Hall element 36 is mounted on the print substrate 35.

An insertion-through hole 32b which is formed between the Hall element 36 and the magnet 37 and to which the shielding plate 23 can be inserted is formed in the HES cover 32 so as to extend in the direction shown by Y. The shielding plate 23 is interlocked with the ejector 24 so as to move forward and backward the insertion-through hole 32b and the Hall element 36 changes a magnitude of magnetic flux density applied from the magnet 37 in accordance with the position of the shielding plate 23. Accordingly, the switch 40 includes at least the shielding plate 23, the Hall element 36, and the magnet 37 and monitors whether the tongue plate 14 is attached to or detached from the buckle main body 11.

The harness restricting cover 33 is made of resin material such as polypropylene and draws out a harness 38 extending from the print substrate 35 along the direction from a harness insertion-through hole 33a to a groove portion 33b formed on the rear surface thereof.

In addition, the HES cover 32 is disposed in a space surrounded by the frame 21 including the pair of side walls 21A and 21B, the bottom portion 21C and the latch member 22 in the vertical and horizontal directions. The frame 21 and the latch member 22 are made of magnetic material. Accordingly, the Hall element 36 and the magnet 37 accommodated in the HES cover 32 are magnetically shielded and thus magnetism of an external magnetic field is shielded. In particular, since the Hall element 36 is disposed close to the center in the direction of magnetic lines from the magnet 37, that is, in the width direction of the frame 21, the Hall element 36 is located at the farthest position from the outer periphery of the buckle, and thus it is difficult for the Hall element 36 to be influenced by an external magnetic field in the width direction of the buckle main body 11.

An operation of the buckle switch mounted to the buckle device will be described.

(1) Initial State (Non-Latch State)

An initial state in which the tongue plate 14 is not mounted to the buckle main body 11 will be described with reference to FIGS. 3A and 4A.

In the initial state, as shown in FIG. 3A, the release button 28 inside the buckle main body 11 is slightly moved in the direction shown by Y1 from the position of the state shown in FIG. 3B described below, and the ejector 24 is moved to the opening 12A by urging force generated from the urging member S1 in the direction shown by Y2. The cantilever 25 is rotated about the shaft portion 25b in the counterclockwise direction shown in FIG. 3 and the stopper 26 is rotated about the rotation shaft 26c in the clockwise direction shown in FIG. 3 in accordance with the position of the release button 28 in the direction shown by Y2. At this time, the lock bar 27 is moved to the upper end of the guide holes 21g in the perpendicular direction and is not retained by the retaining portions 26b of the stopper 26.

However, since the cantilever 25 is rotated in the counterclockwise direction and the height position of the spring retaining protrusion portion 25c is lower than that of the lock convex portion 22d in the direction shown by Z2, the lock portion 25a of the cantilever 25 applied with a horizontal component (a component in the direction shown by Y) of urging force generated from the urging member S1 comes into pressing contact with the lock bar 27 in the direction shown by Y2. For this reason, both ends of the lock bar 27 are pressed by edges of the vertical upper ends inside the guide holes 21g in the direction shown by Y2.

In addition, the latch member 22 is rotated in the counterclockwise direction shown in FIG. 3 by a vertical component (a component in the direction shown by Z1) of the urging member S1 which is in a compressed state. Accordingly, the latch portion 22e of the latch member 22 is set to a non-latch state in which the latch portion 22e is away from the bottom portion 21C of the frame 21 in the direction shown by Z1.

Figure 4A:
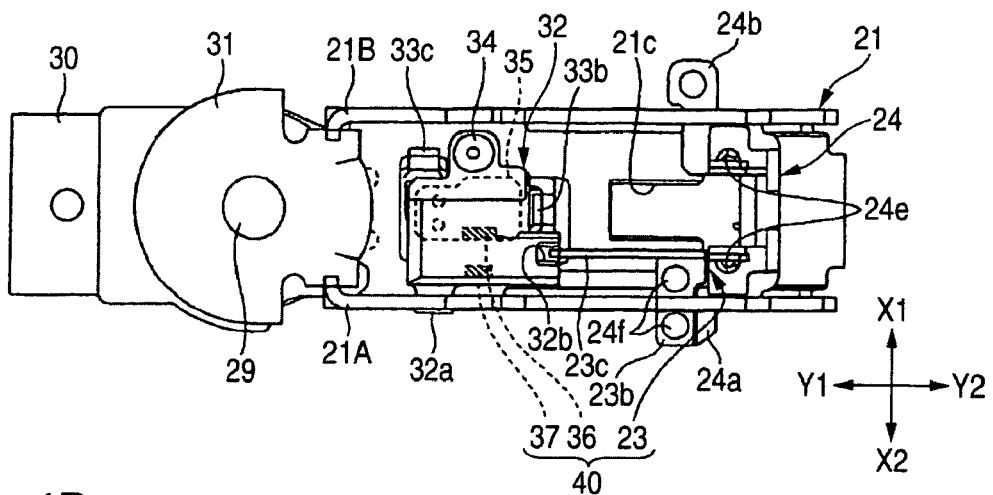

As shown in FIGS. 3A and 4A, in the initial state (non-latch state), since the ejector 24 is moved in the direction shown by Y2, the front end of the shielding portion 23c of the shielding plate 23 attached to the ejector 24 is located at the most retracted position in the insertion-through hole 32b of the HES cover 32. In this state, the shielding plate 23 is not disposed between the Hall element 36 and the magnet 37, and the Hall element 36 generates electromotive force in accordance with a magnitude of a one-way magnetic field generated from the magnet 37 (height of magnetic flux density). Then, current generated by the electromotive force is flown to an external CPU (not shown) through the harness 38. The CPU, for instance, sets a belt winding force alleviating mechanism to be in a non-operable state or sets a belt warning lamp in a vehicle to be in an ON state on the basis of an output signal in the non-latch state or controls an air bag device to be in an appropriate operable state on the basis of other information (for instance, seating information).

(2) Operation in Latch State

Next, a latch state in which the tongue plate 14 is mounted to the buckle main body 11 will be described with reference to FIGS. 3B and 4B.

As shown in FIG. 3B, when the front end of the tongue plate 14 is inserted into the gap G between the bottom portion 21C of the frame 21 and the lower end portion 28f of the release button 28 close to the buckle main body 11, the front end of the tongue plate 14 comes into contact with the pressed portion 24d of the ejector 24 and the ejector 24 is moved in the direction shown by Y1, that is, in the insertion direction. At this time, although the shaft portion 25b of the cantilever 25 is moved to the insertion direction together with the ejector 24 while resisting the urging force generated from the urging member S1, since the lock portion 25a of the cantilever 25 comes in pressing contact with the lock bar 27 in the direction shown by Y2, the cantilever 25 is rotated about the lock bar 27 in the clockwise direction shown in FIG. 3B.

When the cantilever 25 is rotated in the clockwise direction, the spring retaining protrusion portion 25c is moved in the direction shown by Z1, and thus the height position of the spring retaining protrusion portion 25c is set to be the same as that of the lock convex portion 22d of the latch member 22. At this time, since the urging member S1 is deformed in a compressed state and is deformed in a curved manner to be convex in the direction shown by Z1 (see FIG. 3B), a vertical component of urging force generated from the urging member S1 is applied in the direction shown by Z2. Accordingly, the cantilever 25 is further rotated in the clockwise direction shown in FIG. 3B by the component of urging force in the direction shown by Z2.

When the cantilever 25 is rotated in the clockwise direction, the lock portion 25a of the cantilever 25 is pressed down in the direction shown by Z2 while being locked to the lock bar 27. At this time, since the lock bar 27 is vertically moved to the corner in the direction shown by Z2 along the edges of the guide holes 21g, 21g close to the direction shown by Y2 and presses the latch member 22 in the direction shown by Z2, the latch member 22 is rotated about the supporting arms 22a and 22b in the clockwise direction shown in FIG. 3B. At this time, the latch portion 22e provided at the front end of the latch member 22 is inserted into the latch hole 14a provided in the tongue plate 14 and is thrusted into the guide hole 21c provided in the bottom portion 21C of the frame 21, the tongue plate 14 is latched by the latch member 22 (latch state).

When the tongue plate 14 is latched by the latch member 22, an operation in which the tongue plate 14 is inserted in the direction shown by Y1 is stopped. However, since the cantilever 25 is applied with a horizontal component of urging force generated from the urging member S1 in the direction shown by Y2, the ejector 24 mounted with the cantilever 25 is slightly moved in the direction shown by Y2. The reason is because both ends of the lock bar 27 locked to the lock convex portion 25a1 of the lock portion 25a are moved from the corners of the guide holes 21g to retaining portions 21g1, 21g1 of the guide holes 21g, 21g in the state in which the lock bar 27 is in a horizontal state.

At this time, when the lock bar 27 is moved in the direction shown by Y2, since both ends thereof press the operation concave portions 28d, 28d of the release button 28 in the direction shown by Y2, the release button 28 is returned from a position shown in FIG. 3A to a position shown in FIG. 3B while being slightly pressed. Accordingly, since the stopper 26 is rotated about the operation shaft 26a in the direction shown in FIG. 3B, the retaining portions 26b, 26b of the stopper 26 press the lock bar 27 so that the lock bar 27 is locked so as not to return to an original state. Thus, it is possible for the latch member 22 to strongly latch the tongue plate 14 without a case where the latch member 22 pressed by the lock bar 27 in the direction shown by Z2 is easily rotated in the counterclockwise direction.

Figure 4B:
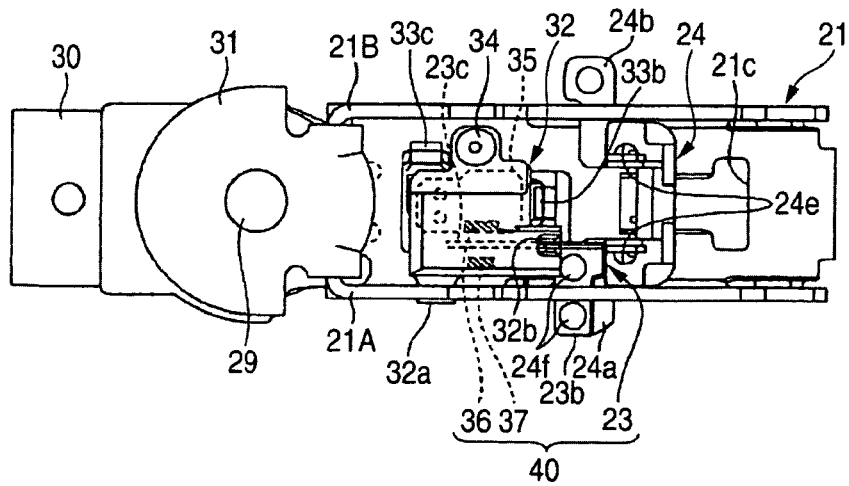

As shown in FIGS. 3B and 4B, in the latch state, since the ejector 24 is moved in the direction shown by Y1, the shielding portion 23c of the shielding plate 23 interlocked with the ejector 24 is advanced into the insertion-through hole 32b of the HES cover 32, and the front end of the shielding portion 23c is located at a position closer to the direction shown by Y1 than the direction shown by Y of the Hall element 36 and the magnet 37, that is, a position close to the anchor plate. Accordingly, since the shielding plate 23 is located between the Hall element 36 and the magnet 37, a magnetic field generated from the magnet 37 is shielded by the shielding plate 23, and thus a magnetic field applied from the magnet 37 to the Hall element 36 changes compared with the non-latch state. For this reason, electromotive power generated from the Hall element 36 changes compared with the non-latch state, and thus current generated by the changed electromotive power is flown to an external CPU through the harness 38. The CPU, for instance, sets a belt winding force alleviating mechanism to be in an operable state or sets a belt warning lamp in a vehicle to be in an OFF state on the basis of an output signal in the latch state or controls an air bag device to be in an appropriate operable state on the basis of other information.

Figure 4C:
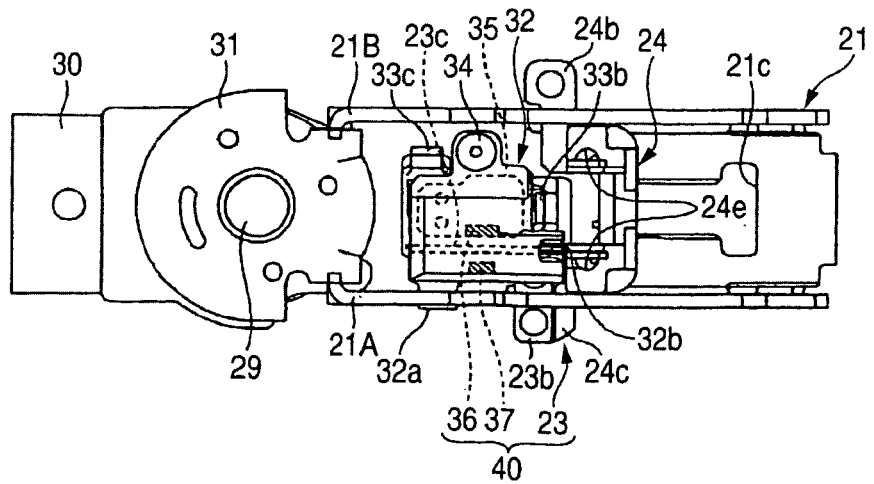
FIG. 4C illustrates a full stroke state.

In addition, FIG. 4C illustrates a full stroke state in which the tongue plate 14 is further inserted into the gap G from the position thereof in the direction shown by Y in the latch state and the ejector 24 is moved to the farthest point close to the direction shown by Y1. In this state, the attachment portion 23b of the shielding plate 23 fixed to the arm portion 24c of the ejector 24 comes into contact with the end of the long hole 21e close to the direction shown by Y1 before the arm portions 24b and 24c of the ejector 24 come into contact with the ends of the long holes 21d and 21e close to the direction shown by Y1. Accordingly, since the frame 21 and the shielding plate 23, which are made of metal, come into contact with each other in the full-stroke state, a collision shock occurring from the frame 21 upon inserting the tongue plate 14, is not applied to the ejector 24 which is made of plastic and/or resin, and thus, it may prevent the ejector 24 from being broken.

(3) Operation of Releasing Latch State

When the release button 28 is pressed in the direction shown by Y1, since the bearing groove 28c of the release button 28 presses the operation shaft 26a of the stopper 26 in the direction shown by Y1, the stopper 26 is rotated in the clockwise direction shown in FIG. 3B. Accordingly, a retaining action between the lock bar 27 and the retaining portions 26b of the stopper 26 is released.

At the same time, since the operation concave portions 28d, 28d of the release button 28 press both ends of the lock bar 27 in the direction shown by Y1, the lock bar 27 is moved horizontally within the guide holes 21g in the direction shown by Y1. At this time, since the lock bar 27 pushes the lock convex portion 25a1 of the cantilever 25 in the direction shown by Y1, the cantilever 25, the slider 23, and the ejector 24 are moved in the direction shown by Y1, thereby compressing the urging member S1.

In addition, when the release button 28 is pushed and the lock bar 27 moves past the corners of the guide holes 21g in the direction shown by Y1, the cantilever 25 is quickly rotated in the counterclockwise direction. Owing to the rotation, the lock bar 27 is lifted up by the lock convex portion 25a1 of the cantilever 25 and is moved to the vertical ends along the guide holes 21g.

At the same time, the height position of the spring retaining protrusion portion 25c of the cantilever 25 is set to be lower than that of the lock convex portion 22d of the latch member 22 in the direction shown by Z2. For this reason, the latch member 22 is rotated in the counterclockwise direction, shown in FIG. 3B, by a vertical component (a component in the direction shown by Z1) of the urging force generated from the urging member S1 which is in a compressed state. Accordingly, since the latch portion 22e of the latch member 22 is separated from the latch hole 14a provided in the tongue plate 14 and the guide hole 21c of the frame 21 (non-latch state), the latch action or latched condition between the latch member 22 and the tongue plate 14 is released to thereby return to the initial state.

Additionally, when the cantilever 25 is quickly rotated in the counterclockwise direction, the ejector 24 is strongly pushed out in the direction shown by Y2. At this time, since the pressed portion 24d of the ejector 24 pushes the front end of the tongue plate in the direction shown by Y2 at one time, the tongue plate is strongly ejected from the opening 12A.

When the ejector 24 is moved in the direction shown by Y2 and becomes the state illustrated in FIG. 3A, the shielding plate 23 returns to the initial state and electromotive power generated by the Hall element 36 changes from that in the latch state to that in the non-latch state. Then, current generated by the changed electromotive power is provided to the CPU through the harness 38.

Therefore, according to the buckle device 10 attached with the switch according to this embodiment, the switch 40 includes the Hall element 36 which outputs a signal in accordance with a magnitude of magnetic flux density, the magnet 37 which applies a magnetic field to the Hall element 36, and the shielding plate 23 which is attached to the ejector 24 and interlocked with the ejector 24 and which changes a magnitude of magnetic flux density applied from the magnet 37 to the Hall element 36 in accordance with the position of the ejector 24. Since the Hall element 36 and the magnet 37 are magnetically shielded by at least the frame 21 and the latch member 22 which are made of a magnetic member, it is possible to surely restrict an influence of an external magnetic field. Additionally, since the magnetic flux density detected by the Hall element 36 is hardly influenced by a positional difference of the shielding plate 23 with respect to the Hall element 36 and the magnet 37, it is easy to configure the switch 40 without an error.

Additionally, since the frame 21 includes the pair of side walls 21A and 21B and the bottom portion 21C provided between the pair of side walls 21A and 21B, and the Hall element 36 is positioned far from the side wall 21A relative to the magnet 37, it is possible to more surely restrict an influence of an external magnetic field.

Further, since the switch 40 includes the HES cover 32 which is attached to the bottom portion 21C of the frame 21 so as to be surrounded by the frame 21 and the latch member 22, which accommodates the Hall element 36 and the magnet 37, and which has the insertion-through hole 32b formed between the Hall element 36 and the magnet 37 so that the shielding plate 23 is inserted therethrough, it is easy to attach the Hall element 36 and the magnet 37 to the buckle main body 11 or to position the shielding plate 23 between the Hall element 36 and the magnet 37, thereby improving an attachment.

Furthermore, since the attachment portion 23b of the shielding plate 23 comes into contact with the frame 21 when the tongue plate 14 is further inserted from the position of the state in which the tongue plate 14 is latched to the buckle main body 11, the ejector 24 made of resin does not directly come into contact with the frame 21 made of metal, and thus it is possible to prevent the ejector 24 from being broken.

Moreover, the buckle device attached with the switch is not limited to this embodiment, but may be appropriately modified into various forms. Accordingly, this application hereby incorporates by reference Japanese patent application no. 2005-265760, filed Sep. 13, 2005.

As a person skilled in the art will appreciate, the above description is meant as an illustration of implementation of the principles of this invention. This description is not intended to limit the scope or application of this invention in that the invention is susceptible to modifications, variation and change, without departing from the spirit of this invention, as defined in the following claims.

The invention claimed is:

1. A buckle device comprising:
   a tongue plate that is part of a seat belt;
   a buckle main body for which the tongue plate attaches thereto and detaches therefrom; and
   a switch for monitoring whether the tongue plate is one of attached to and detached from the buckle main body,
   wherein the buckle main body includes:
      a frame;
      an ejector disposed on the frame so as to slide in a direction in which the tongue plate is one of inserted and separated, and which pushes the tongue plate from the buckle main body upon releasing a latched condition between the tongue plate and the buckle main body; and
      a latch member which rotates to latch the tongue main body upon inserting the tongue plate into the buckle main body,
   wherein the switch includes:
      a magnetic detector which outputs a signal corresponding to a magnitude of magnetic flux density;
      a magnet which applies a magnetic field to the magnetic detector; and
      a shielding plate which is attached to the ejector and interlocked with the ejector and which changes the magnitude of magnetic flux density provided by the magnet to the magnetic detector in response to a position of the ejector, and wherein the magnetic detector and the magnet are magnetically shielded by at least the frame and the latch member, the frame and the latch member being made of a magnetic material.

2. The buckle device according to claim 1, wherein the frame includes a pair of side walls and a bottom portion provided between the pair of side walls, and the magnetic detector is positioned far from the side wall relative to the magnet.

3. The buckle device according to claim 2, wherein the switch includes a cover member which is attached to the bottom portion of the frame so as to be surrounded by the frame and the latch member, and accommodates the magnetic detector and the magnet therein, and the cover member has an insertion-through hole formed therethrough that is between the magnetic detector and the magnet, and wherein the shielding plate is inserted through the insertion-through hole.

4. The buckle device according to claim 1, wherein when the tongue plate is further inserted from a position of the latch state where the tongue plate is latched to the buckle main body, a part of the shielding plate comes into contact with the frame.

\* \* \* \* \*